April 30, 1957  A. K. HANNUM  2,790,686
PISTON RING
Filed May 4, 1953  2 Sheets-Sheet 1
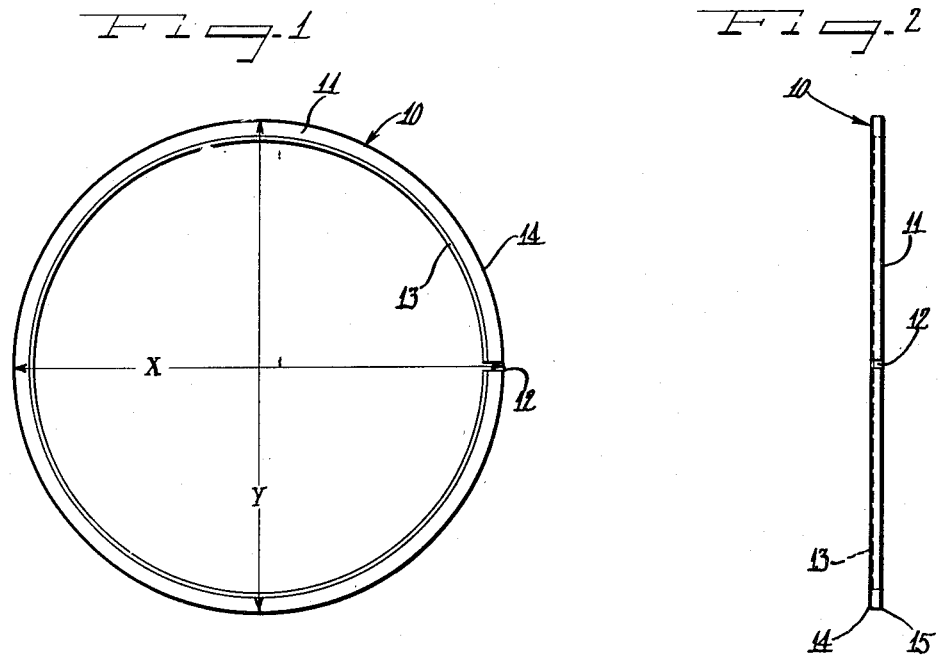
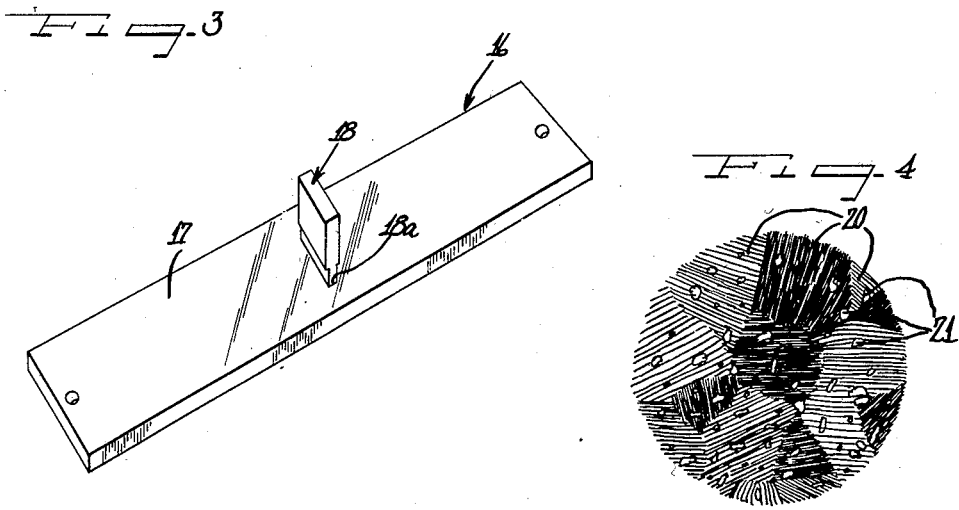
Inventor
Albert K. Hannum

United States Patent Office 2,790,686
Patented Apr. 30, 1957

2,790,686

PISTON RING

Albert K. Hannum, Willoughby, Ohio, assignor to Thompson Products, Inc., Cleveland, Ohio, a corporation of Ohio Application May 4, 1953, Serial No. 352,689

3 Claims. (Cl. 309—44)

This invention relates to scuff-resisting metal packing rings suitable for use as compression piston rings in internal combustion engines. Specifically, this invention relates to high- or medium-carbon, chromium-steel, scuff-resisting piston rings.

Heretofore, compression rings for pistons have either been made of cast iron or chromium-plated alloys to resist seizure and scuffing. Attempts to provide uncoated steel compression rings have always resulted in a ring that scuffed. Since steel rings better resist wear and are stronger than cast iron rings, they can be less massive and give better performance than iron rings. However, expensive chromium plating of such rings has been necessary to increase their scuff resistance. The chromium-plated steel rings, in spite of their increased cost, must be properly lapped in a cylinder to give good performance and in the absence of such treatment these rings may have hard, ill-fitting areas which cause scuffing in the initial wear-in operation of the engine. Further, heretofore known steel piston rings are subjected to a separate shaping operation subsequent to initial hardening. The temperatures required for shaping do not permit a worthwhile selection of microstructures and constrain the manufacturer to produce a tempered martensite microstructure which does not have good scuff resistance.

The present invention now provides uncoated steel compression piston rings having greater scuff resistance than any heretofore known uncoated steel ring. The scuff resistance of the rings of this invention is of the same or greater order as the scuff resistance of cast iron rings. These rings can be shaped simultaneously with a transformation heat treatment to produce a desired lamellar pearlitic microstructure. A heretofore necessary separate shaping step is eliminated and a heretofore unobtainable piston ring microstructure is obtained.

It has been found that scuff-resisting surfaces i. e. surfaces which resist scratching, roughening or "pull out" under rubbing action, should have the following characteristics:

1. Ability to form strong protective surface films of oxides or other contaminants;
2. Possess open non-homogeneous surface structure so that trapped materials can contaminate this surface; and
3. Be of such composition and micro-structure as to not foster intersurface welds with the co-sliding engine material.

The uncoated steel compression piston rings of this invention possess each of the above characteristics especially when operated in cast iron cylinders such as are commonly used in internal combustion engines. The rings of this invention have a microcrystalline structure which is open and non-homogeneous and which can be oxidized to form the protective surface films. In addition, the rings of this invention have a chemical composition which will not readily form a solid solution in cast iron. The microcrystalline structure of the rings is predominantly fine lamellar pearlite which is substantially devoid of free ferrite and which has not been permitted to develop either martensite or tempered martensite. The pearlitic microstructure contains iron-chromium carbides embedded therein. The rings have a Rockwell hardness of about 27 to 30 on the "C" scale and this hardness promotes low ductility so that the rings are much less brittle than cast iron rings.

The steel used for the rings is a medium-to-high-carbon, chromium-steel which may contain from ½ to 1.5 percent carbon and from ½ to 10 percent chromium, balance iron together with traces of manganese, silicon, phosphorus and sulphur. The microcrystalline structure is developed by heat treatment to form austenite and by controlled cooling or isothermal quenching to form the fine lamellar pearlite with the iron-chromium carbides therein. The chromium content of the steel must be sufficiently low with relation to the carbon content as to avoid the formation of martensite or the retention of austenite upon cooling.

The rings of this invention preferably have "plus circularity," i. e. a greater diameter running through the gap and the heel of the ring than through the axis at right angles thereto when compressed to the installed end gap condition.

It is then an object of this invention to provide uncoated, steel piston rings having a scuff resistance comparable with cast iron rings.

A further object of this invention is to provide inexpensive, high-or-medium-carbon, chromium-steel compression rings for pistons which have desirable physical qualities heretofore only available in expensive, chromium-plated rings.

A still further object of this invention is to provide a high-or-medium-carbon, chromium-steel piston ring with a fine lamellar pearlitic microstructure containing iron-chromium carbides.

A still further object of this invention is to provide an uncoated, chromium-steel compression piston ring with a microstructure that is open and non-homogeneous.

Another object of this invention is to provide a chromium-steel piston ring with an open, non-homogeneous rubbing surface capable of forming protective oxide surface films thereon which will not readily form minute welds with an iron cylinder wall.

A still further object of this invention is to provide an uncoated, scuff-resisting, steel piston ring having "plus circularity."

Other and further objects of this invention will be apparent to those skilled in the art from the following detailed description of the annexed sheets of drawings and from the following examples.

On the drawings:

Figure 1 is a plan view of a piston ring according to this invention.

Figure 2 is a side elevational view of the ring of Figure 1.

Figure 3 is an isometric view of the sliding components of a test rig for determining scuff resistance.

Figure 4 is a photomicrograph of the piston ring of this invention.

As shown on the drawings:

Figure 5:
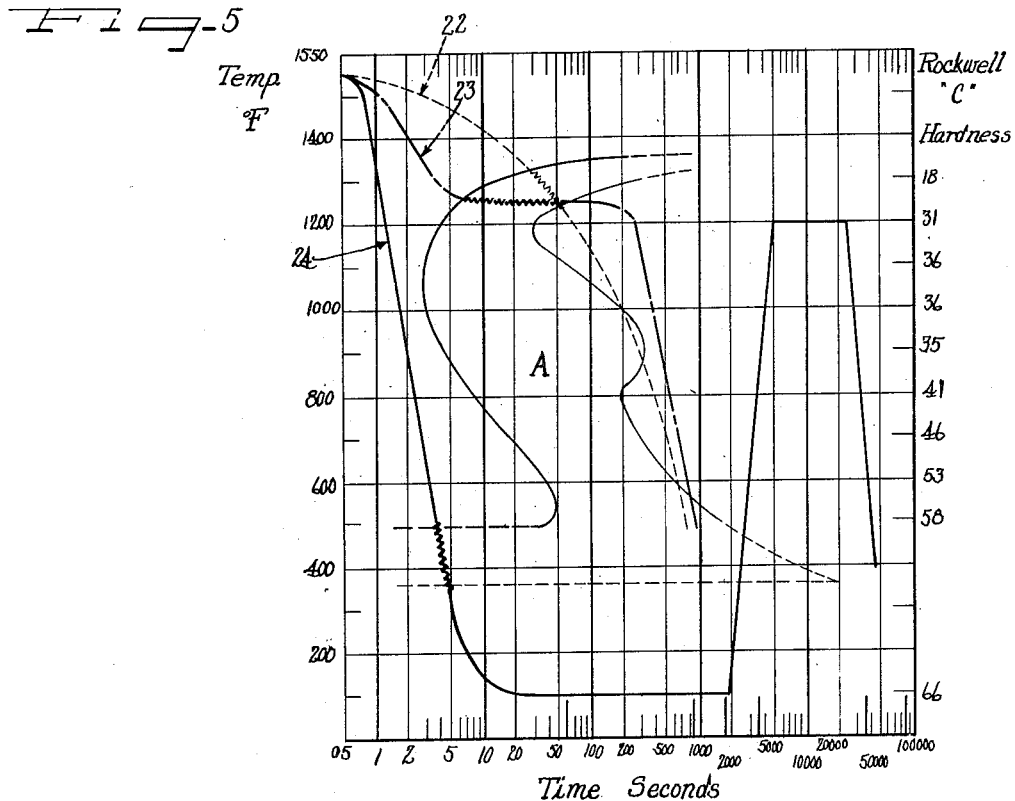
Figure 5 is a chart illustrating the heat treatments for producing the ring of this invention.

In Figures 1 and 2, the preferred form of piston ring 10 of this invention has a ring body 11 with a slot or gap 12 between the ends thereof. The body 11 has flat top and bottom faces and flat cylindrical inner and outer side walls. A chamfer 13 is provided between the top face and the inner peripheral wall. The outer edges of the ring are chamfered at both the top and bottom faces thereof as illustrated at 14 and 15.

When the ring is compressed to its proper gap clearance as shown in Figure 1, the diameter X thereof extending through the gap and through the heel of the ring, is greater than the diameter Y extending through the sides of the ring normal to the diameter X. The ring thus possesses "plus circularity" to increase the load at the ends of the ring thereby minimizing tip flutter. The "plus circularity" may range between .003 inch and .008 inch for most automotive sizes up to about 5 inches in diameter.

The external chamfers 14 and 15 remove sharp corners or burrs to prevent the ring from digging into the cylinder wall. The inner chamfer makes possible a transverse twisting of the ring in operation to facilitate wear-in and initial scuff resistance.

To determine the relative scuff resistance of the various piston ring materials, the test rig 16 of Figure 3 was provided. This rig includes a reciprocating plate 17 composed of material representing the cylinder wall of an internal combustion engine. This plate is about 1 inch wide and about 4½ inches long and has a smoothly ground microfinished top face with the direction of the grind being about 45 degrees to the longitudinal axis thereof. A test specimen 18 of the piston ring material, in the form of a slug with a reduced bottom end is mounted on the top face 17. As shown, this slug 18 has an end face 18a about ½ inch long and about 1/16 inch wide presenting a loaded area of 1/32 square inch. The slug 18 is adapted to be loaded from ¼ pound up to 30 pounds resulting in a range of specific loads from 8 p. s. i. to 960 p. s. i.

The test procedure consists of installing the specimen 18 on the face 17 of the plate and reciprocating the plate through a 3-inch stroke to lap the faces 17 and 18a together until complete contact is obtained as evidenced on the face 18a. A lapping compound such as Carborundum paste can be used for this purpose. Both faces 17 and 18a are then thoroughly flushed with acetone to remove all traces of the lapping compound. The specimen 18 is then loaded with a 1-pound weight and the load is increased in increments of 1 pound at time intervals of 0.1 hour. Two drops of kerosene are applied to the sliding plate as lubricant at the beginning of the test and at each load increase. The test is continued until scuffing occurs as evidenced by roughing of the face 18a, and/or plate 17. Since gray cast iron has a surface structure interrupted by random distribution of flaked graphite and since it forms a strong protective surface film of oxides and contaminants, as anticipated, the tests showed this material to possess good scuff resistance of the test rig. The hard chrome-plated steels possessed less scuff resistance than gray cast iron.

The tests further established that annealed high-carbon steels possessing a spheroidal or pearlitic microstructure which is comparatively non-homogeneous and open in contrast with a martensitic structure possessed good scuff resisting properties. The scuff resistance was materially improved if this microstructure included chromium carbides embedded at random therein.

Figure 4 is a drawing of a photomicrograph of a test specimen of this invention composed of annealed S. A. E. 52100 high-carbon chromium-steel of the following specific formula:

| | Percent |
|---|---|
| Carbon | 1.02 |
| Manganese | 0.36 |
| Silicon | 0.33 |
| Nickel | 0.20 |
| Chromium | 1.41 |

Balance iron together with traces of phosphorus and sulphur.

Similar microstructure is obtained in S. A. E. 52100 steels of the following general formula:

| | |
|---|---|
| Carbon | 0.95–1.1%. |
| Manganese | 0.25–0.45%. |
| Chromium | 1.30–1.60%. |
| Phosphorus | 0.025% Max. |
| Sulphur | 0.025% Max. |
| Silicon | 0.20–0.35%. |
| Iron | Balance. |

The heat treatment consisted of heating the specimen to temperatures above the critical range to austenize the steel. Temperatures of 1550° F. were used. The specimen was then cooled in quiescent ambient air to convert the austenite into fine lamellar pearlite with embedded iron-chromium carbides. A Rockwell hardness of about 27 on the "C" scale was obtained. As shown in Figure 4, the fine lamellar pearlite is indicated at 20 and the embedded iron-chromium carbides are indicated at 21. Little, if any, free ferrite is apparent. The magnification for the drawing of Figure 4 is at 1500 diameters.

Two heat treating procedures suitable for producing the structure of Figure 4 in the above indicated specific S. A. E. 52100 steel are illustrated in the chart of Figure 5 and contrasted with a heat treatment which is unsatisfactory. This chart plots temperature in ° F. vs. time in seconds and includes a local area A where transformation of austenite occurs. The chart also shows the Rockwell hardness on the "C" scale of the heat treated steel to emphasize the relationship between the method of transformation and the resulting structure and hardness with this specific steel. The hardness obtained is an adjunct to the microstructure and will vary with different steel formulae having the microstructure produced by this invention. For the specific illustrated S. A. E. 52100 steel, the illustrated heat treatment produces a Rockwell hardness of about 27 to 30 on the "C" scale.

The dotted curve 22 illustrates the cooling of the aforementioned specific S. A. E. 52100 steel from 1550° F. at a controlled cooling rate which can be either fixed or exponential. At 1550° F., the S. A. E. 52100 steel is completely austenized and as it is cooled from this temperature it enters the conversion zone A at about 1325° F. and emerges from the zone A at about 1225° F. This illustrates an exponential cooling rate in the zone A of only about 20 to 30 seconds. Transformation from austenite into the fine lamellar pearlite with the iron-chromium carbides of Figure 4 is thus effected and a Rockwell hardness of about 27 on the "C" scale is obtained. The further cooling will not change the structure or hardness.

The dot-dash curve 23 illustrates the isothermal cooling treatment of this invention where the aforementioned specific S. A. E. 52100 alloy is cooled from 1550° F. to enter the transformation zone A at about 1225° F. It is held at this temperature for about one minute and it emerges from the transformation range with a Rockwell hardness of about 27 on the "C" scale and with the lamellar pearlitic structure of Figure 4. In both of these curves 22 and 23, transformation is completed at approximately the same temperature and the same Rockwell hardness is obtained.

During the illustrated heat treatments, the rings can be held in jigs or pressed to the desired shape.

The solid-line curve 24 illustrates a quenching treatment which is unsatisfactory and will not produce the structure of Figure 4. As therein shown, the aforementioned specific S. A. E. 52100 steel is quenched from 1550° F. to enter the zone A at a temperature of about 500° F. Transformation occurs as illustrated and the curve emerges from the zone A at about 375° F. This transformation is from austenite to martensite with entrained carbides. A very high Rockwell hardness is obtained in the order of 60 or more on the "C" scale.

An attempt to anneal or temper the construction to produce a softer and less brittle microcrystalline structure resulted in the formation of tempered martensite, sorbite and embedded carbides at temperatures of around 1200° F. as illustrated. After this heat treatment a Rockwell hardness of about 31 on the "C" scale was obtained but the structure did not possess the scuff resistance of the structure obtained in the heat treatments illustrated by the curves 22 and 23.

The chart of Figure 5 therefore, shows that transformation must occur at relatively high temperatures and must be completed before Rockwell hardnesses of substantially more than about 30 on the "C" scale are obtained.

It will, of course, be understood that the chart of Figure 5 only shows heat treatments for a specific steel and the heat treatments will, of course, vary as the steel formula varies. The heat treatments, in any event, should be conducted to produce the microcrystalline structure of Figure 4 and the Rockwell hardness which accompanies that structure in the specific steel being used.

Figure 6:
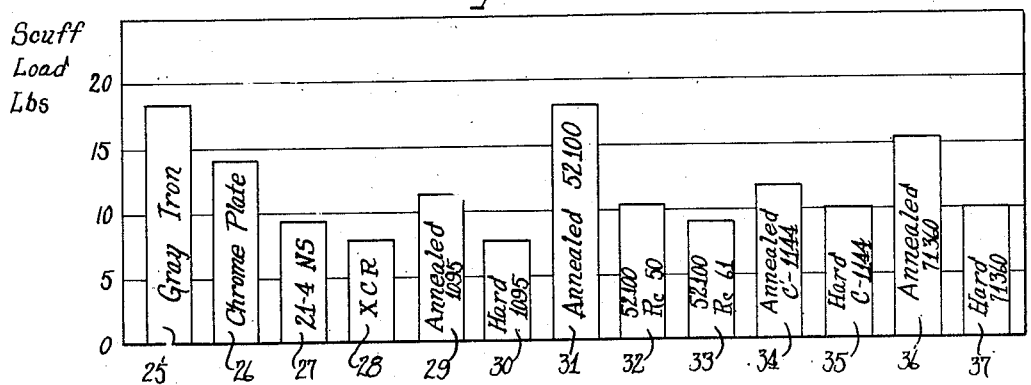
Figure 6 is a chart of the comparative average performance of the scuff resistance of various piston ring materials.

The bar chart of Figure 6 shows the results of tests of various alloys on the test rig of Figure 3 and illustrates the load on the test rig at which scuffing occurred following the testing procedure described hereinabove. As shown by the bar 25, cast gray iron rings show an appreciable high scuff resistance. The bar 26 illustrates the fact that hard, chromium-plated cast iron rings have less scuff resistance than the unplated rings.

The bars 27 to 37 inclusive, illustrate the scuff resistance of various alloys and various heat treatments. The following table identifies the alloys and the microstructure thereof.

The annealed S. A. E. 52100 steel of bar 31 having the above discussed lamellar pearlite structure and a Rockwell hardness within the range of 27 to 30 on the "C" scale, possesses the best scuff resistance of all of the steels that were tested. The annealed 71360 alloy of bar 36 having a predominantly ferrite structure and an appreciable tungsten content, possessed the second best scuff resistance of the tested steels.

The annealed S. A. E. 52100 piston rings of this invention have been engine-tested under full load conditions for 500 hours with satisfactory blowby results continuing throughout the entire test. In each instance, the blowby was less than or of the same order as the blowby obtained with cast iron rings. At the conclusion of the tests, the rings of this invention showed only normal running marks on the cylinder contacting surfaces. The test was equivalent to 27,500 miles of full load operation at 200 R. P. M. overspeed.

From the above descriptions and disclosures it will, therefore, be understood that this invention now provides a scuff-resisting, high-or-medium-carbon, chromium-containing, steel piston ring. The rings of this invention have a microcrystalline structure developed through proper heat treatment. A Rockwell hardness within a limited controlled range is maintained.

I claim as my invention:

1. A scuff-resisting packing ring comprising a chromium-steel split ring containing from ½ to 1.5 percent carbon and from ½ to 10 percent chromium, balance substantially all iron, and said ring possessing an open non-homogeneous microstructure composed of fine lamellar pearlite with undissolved iron-chromium carbides therein.

2. A steel scuff-resisting piston ring which comprises a split wrought steel ring of the following formula:

| | |
|---|---|
| Carbon | 0.95–1.1%. |
| Manganese | 0.25–0.45%. |
| Chromium | 1.30–1.60%. |
| Phosphorus | 0.025% Max. |
| Sulphur | 0.025% Max. |
| Silicon | 0.20–0.35%. |
| Iron | Balance. | said ring having a fine lamellar pearlitic microstructure with embedded iron-chromium carbides and being substantially free from ferrite and having a Rockwell hardness of from 27 to 30 on the "C" scale.

3. A compression piston ring for heat engines which comprises a split steel ring of the following formula:

| | Percent |
|---|---|
| Carbon | 1.02 |
| Manganese | 0.36 |
| Silicon | 0.33 |
| Nickel | 0.20 |
| Chromium | 1.41 |

Balance iron together with traces of phosphorus and sulphur said ring having a predominantly fine lamellar pearlitic structure substantially free from free ferrite and containing iron-chromium carbides embedded therein, said ring having a Rockwell hardness of from 27 to 30 on the "C" scale and presenting an uncoated, scuff-resisting periphery to a cylinder wall.

| Material | Micro Structure | Composition, Percent | | | | | | | | |
|---|---|---|---|---|---|---|---|---|---|---|
| | | C | Mn | P | S | Si | Ni | Cr | Other | Fe |
| 21-4 NS Steel | Bar 27, Austenitic | 0.60 | 9.0 | 0.030 Max. | 0.055 | 0.25 Max. | 3.87 | 21.0 | Nitrogen 0.40 | Bal. |
| XCR | Bar 28, Sigma Phase | 0.37 | 3.87 | | | 1.06 | 3.83 | 23.9 | Molybdenum 1.3 | Bal. |
| SAE 1095 | Bar 29, Lamellar Pearlite / Bar 30, Tempered Martensite | 0.95 | 0.40 | 0.040 | 0.050 | | | | | Bal. |
| SAE 52100 | Bar 31, Lamellar Pearlite / Bar 32, Tempered Martensite / Bar 33, Martensite | 1.02 | 0.35 | 0.025 Max. | 0.025 Max. | 0.27 | | 1.45 | | Bal. |
| SAE C-1144 | Bar 34, Pearlite / Bar 35, Martensite | 0.44 | 1.50 | 0.045 | 0.28 | | | | | Bal. |
| 71360 | Bar 36, Ferrite / Bar 37, Tempered Martensite | 0.55 | 0.30 | | | 0.30 | | 3.50 | Tungsten 13.5 | Bal. |

References Cited in the file of this patent

UNITED STATES PATENTS

| | | |
|---|---|---|
| 1,050,102 | Campbell | Jan. 14, 1913 |
| 1,214,549 | Johnson | Feb. 6, 1917 |
| 1,973,263 | Mitchell | Sept. 11, 1934 |
| 2,035,392 | McCarroll et al. | Mar. 24, 1936 |
| 2,068,042 | Teetor | Jan. 19, 1937 |
| 2,183,358 | Six | Dec. 12, 1939 |

OTHER REFERENCES

"Atlas of Isothermal Transformation Diagrams," pp. 12, 13, 76, 77, by U. S. Steel Corp.

"Steel and Its Heat Treatment," by Bullens, vol. 3, 5th edition, 1949.